United States Patent [19]

Ackley, Sr. et al.

[11] Patent Number: 4,682,683

[45] Date of Patent: * Jul. 28, 1987

[54] METHOD AND APPARATUS FOR REMOVING IMPROPERLY ORIENTED ARTICLES FROM A MOVING ARTICLE

[75] Inventors: Charles E. Ackley, Sr., Sarasota, Fla.; Charles E. Ackley, Jr., Tuckerton, N.J.

[73] Assignee: R. W. Hartnett Company, Philadelphia, Pa.

[ * ] Notice: The portion of the term of this patent subsequent to Jul. 19, 2000 has been disclaimed.

[21] Appl. No.: 590,201

[22] Filed: Mar. 16, 1984

Related U.S. Application Data

[63] Continuation-in-part of Ser. No. 939,066, Sep. 1, 1978, Pat. No. 4,437,559.

[51] Int. Cl.$^4$ .............................................. B65G 47/24
[52] U.S. Cl. .................................... 198/380; 198/384; 198/399
[58] Field of Search ............... 198/380, 397, 398, 399, 198/493, 689, 339, 384, 392, 443, 655, 339.1, 803.5, 803.14; 101/37, 426

[56] References Cited

U.S. PATENT DOCUMENTS

| | | | |
|---|---|---|---|
| 2,785,786 | 3/1957 | Bartlett | 198/398 |
| 3,782,526 | 1/1974 | Simons | 198/399 |
| 3,868,900 | 3/1975 | Ackley | 101/426 |
| 3,917,055 | 11/1975 | VandenBerg et al. | 198/399 |
| 4,393,973 | 7/1983 | Ackley, Sr. et al. | 198/398 |
| 4,437,559 | 3/1984 | Ackley, Sr. et al. | 198/397 |

Primary Examiner—Joseph E. Valenza
Assistant Examiner—D. Glenn Dayoan
Attorney, Agent, or Firm—Austin R. Miller

[57] ABSTRACT

Methods and apparatus are provided to arrange individual ones of a plurality of substantially similar articles in a regularly spaced moving array, to position those individual articles substantially uniformly in the array and to transport the array to a work station by storing a plurality of the articles, removing the articles from the storage area, positioning the articles uniformly with respect to one another at positions in an arrangement corresponding to the array, removing improperly positioned articles from the positions within the arrangement corresponding to the array and receiving the arranged articles after the improperly positioned articles have been removed for transporting the articles in the spaced arrangement defining the array to a work station.

5 Claims, 7 Drawing Figures

METHOD AND APPARATUS FOR REMOVING IMPROPERLY ORIENTED ARTICLES FROM A MOVING ARTICLE

This patent application is a continuation-in-part of Ser. No. 939,066 filed 9/1/78, now U.S. Pat. No. 4,437,559, granted Mar. 20, 1984 entitled Method and Apparatus for Removing Non-Rectified Capsules From a Capsule Rectification and Transport Device.

BACKGROUND OF THE INVENTION

1. Field of the Invention

This invention relates to small article transport and/or positioning apparatus and methods in which means are provided to remove improperly positioned small articles from a moving array of same. Small articles such as pharmaceutical capsules, pharmaceutical tablets, candies, machine parts, cigarettes, buttons and the like are transported in large numbers and at high speed in an array along a predetermined path. Upon one of the articles being mispositioned in the array, the mispositioned article(s) is quickly and reliably removed from the moving array.

The articles may be somewhat symmetrical with respect to an axis through the article and may have portions having different dimensions with respect to the same axis of the article. Examples of such articles are telescoping pharmaceutical capsules, pharmaceutical tablets having bulbous sides, screws having enlarged heads, hard candies and the like. These articles may be "rectified" or positioned with all of the articles in the moving array having their axes aligned in a common direction with respect to the direction of movement and having their portions of different dimensions positioned in a common orientation, with respect to the article axes, while in the moving array.

If the articles are merely odd shaped, such as solid nut candies, the articles may be regularly placed and spaced in the array but not rectified or positioned. Rectification has no meaning with respect to such articles.

2. Description of the Prior Art

Machines which automatically sort, transport and arrange, position or rectify articles, such as pharmaceutical capsules, pharmaceutical tablets and candies are known in the art. Typically the capsules, tablets or other articles are randomly loaded into a hopper, transferred to a conveyor and then rectified, positioned or otherwise moved into a desired orientation in a moving array. Finally the articles travel to a work station, such as a printing station. U.S. Pat. Nos. 2,931,292 and 3,931,884 disclose representative prior art devices. U.S. Pat. No. 3,871,295 discloses pharmaceutical capsule rectification.

It is desirable to provide an article trnsport device which removes non-rectified or improperly positioned articles from a moving array without destructing the removed articles, so they can be subsequently reprocessed.

SUMMARY OF THE INVENTION

This invention provides apparatus and methods for arranging individual articles of a group of substantially similar solid articles in a regularly spaced moving array, positioning those articles substantially uniformly in the array and transporting the array to a work station, including apparatus and methods for storing the articles, removing the articles individually from the storage area, positioning the articles individually and substantially uniformly with respect to one another at positions within the spaced arrangement corresponding to the array, removing improperly oriented articles from individual positions of the spaced arrangement corresponding to the array and transporting the positioned articles after the improperly positioned articles have been removed from the spaced arrangement defining the array.

DESCRIPTION OF THE PREFERRED EMBODIMENTS AND BEST MODE KNOWN FOR PRACTICE OF THE INVENTION

Figure 1:
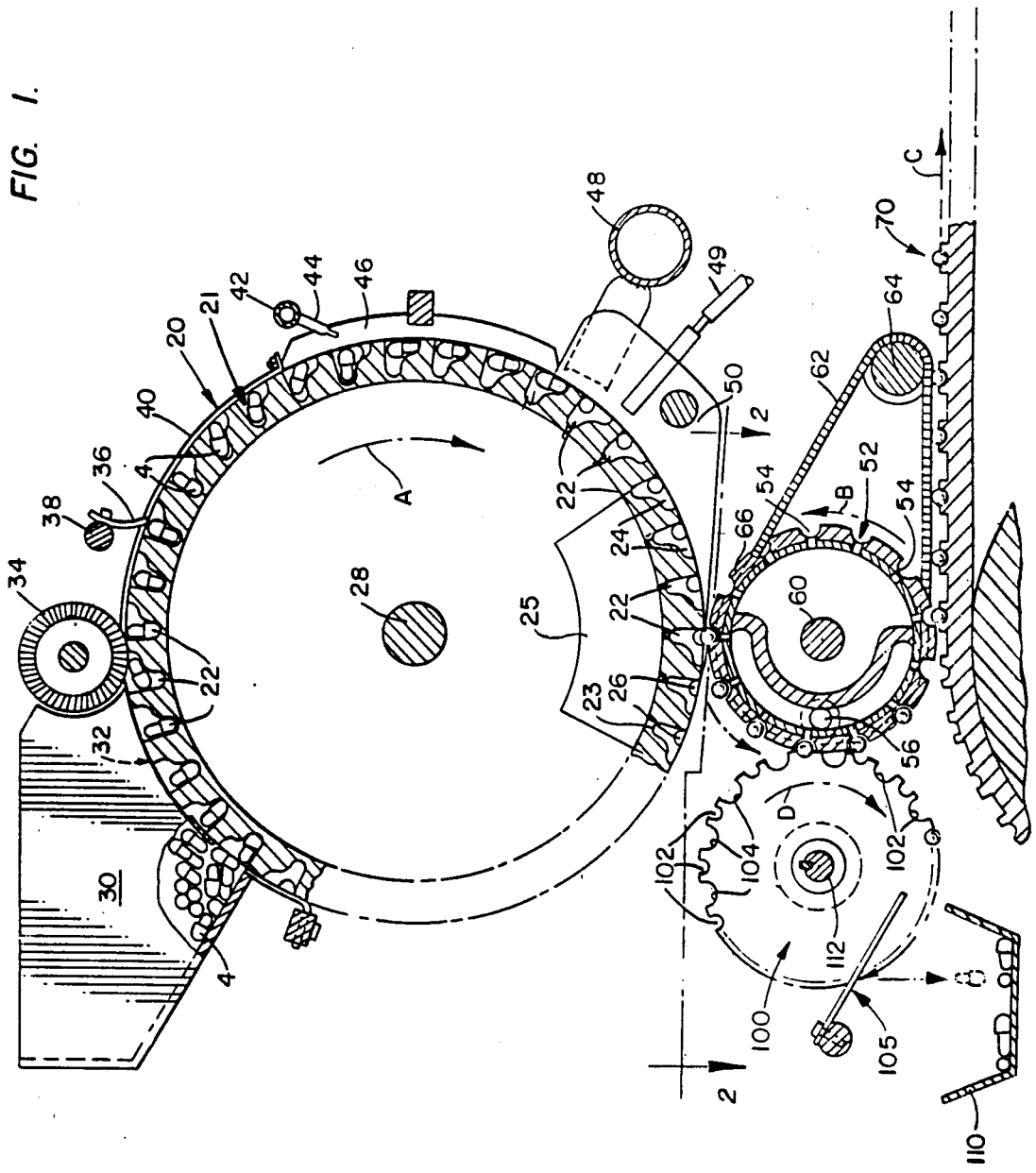
FIG. 1 is a view in side elevation, with certain parts shown in section, of apparatus embodying aspects of the invention.

FIG. 1 shows an article transport and rectification or positioning apparatus including article rectification devices in the form of gauging blocks, air or other fluid jets and a vacuum manifold of the type disclosed in U.S. Pat. Nos. 3,931,884 and 4,104,966, hereby incorporated by reference.

FIG. 1 shows a continuously rotatable transport cylinder or feed drum 20 provided with article transport cavities 21. The article transport cavities or pockets are sized and shaped to receive the particular articles being transported. Transport cylinder or feed drum 20 rotates as shown by arrow A in FIG. 1. When the articles transported are telescoping pharmaceutical hard gelatin capsules, each article transport pocket may include a radially oriented portion 22, a longitudinal portion 24 extending parallel to the direction of travel of the surface of the cylinder or feed drum 20, and an axially oriented, transverse portion 26.

Preferably, several adjacent rows of article transport cavities are provided on the transport cylinder or feed drum 20. Each row may extend circumferentially around the transport cylinder or feed drum 20. Transport cylinder or feed drum 20 rotates on shaft 28 journaled in two side frames, not shown.

A hopper 30 above the transport cylinder or feed drum 20 has an opening 32, close to or at its bottom, through which the articles, shown as capsules 4, fall to enter the pockets 21 of the cylinder or feed drum 20. A rotatable brush 34 may be downstream of hopper 30, as shown in FIG. 1. Brush 34 may gently rub or be slightly spaced from the surface of the feed drum 20. Brush 34 preferably brushes improperly positioned articles into pockets 21 and, when the articles are telescoping pharmaceutical capsules, preferably into radial portions 22 of pockets 21. In any event, brush 34 eliminates articles which protrude excessively from pockets 21, by brushing the articles down into pockets 21 or, where two articles occupy a single pocket 21, by fliping an improperly positioned article out of pocket 21.

Finger-like tabs 36 may be provided on shaft 38 extending across the width of feed drum 20 and bearing against articles 4 in each row of pockets 21, so articles 4 seat in pockets 21. Alignment wires 40 or other guides may extend along the surface of cylinder 20 to prevent articles 4 from falling into improper portions of the pockets 21, such as axial portion 26.

Downstream of alignment wires 40, a fluid manifold 42 and associated fluid jet discharge conduits 44 may direct a transport direction-oriented stream of fluid, preferably air, towards articles 4. Article positioning devices such as gauging blocks 46 may be provided close to the feed drum surface to prevent movement of articles, for instance, "caps up" capsules, into the longitudinal pocket portions 24 but to allow movement of other articles, for instance, "body up" capsules into longitudinal pocket portions 24. The article position regulating devices such as gauging blocks 46 may also inhibit stray and eddy fluid currents, developing from the fluid jets emmitted from conduits 44, from affecting neighboring rows of pockets.

Downstream from the article position regulating device 46, a vacuum source 48 and an air source 49 may be provided. The vacuum source 48 and/or the air source 49 may exert force on the articles 4, as they travel in pockets 21 away from article position regulating device 46, and shift articles 4 sidewise into axial pocket portions 26 in rectified positions. The articles are prevented from falling out of the axial pocket portions 26 by a curved guide 50 which keeps the articles in their pockets 21 as the articles and pockets move downwardly due to rotation of feed drum 20. After leaving the influence of guide 50 the articles transfer to pockets 54 in a transfer conveyor or cylinder 52, which is close to and preferably below feed drum 20, as shown in FIG. 1. Pockets 54 may be formed in the surface of transfer conveyor 52 or may be provided by carriers on the surface of transfer conveyor 52.

The vacuum source and associated devices may pivot away from transport cylinder 20. See U.S. Pat. No. 4,231,462, incorporated by reference, for suitable apparatus.

Transfer conveyor or drum 52 rotates, as indicated by arrow B, on axle 60 and is at least close to and perhaps tangent with feed drum 20. Rotation of feed drum 20 and transfer drum 52 are synchronized so pockets 54 in or on drum 52 are directly beneath and communicating with transport cavities 21 of cylinder 20 just after articles 4 carried by feed drum 20 emerge from the influence of guide 50. When pockets 21 and 54 are in communication, article transfer from pockets 21 in cylinder 20 to pockets 54 in drum 52 occurs.

A vacuum source 56 may be provided within drum 52 to aid transfer of articles 4 from pockets 21 in cylinder 20 to pockets 54 in drum 52. An air or other fluid blast may be provided, as a shoe 25 within cylinder 20 to urge articles 4 to evacuate pockets 21. Holes 23 may be provided in the bottoms of pockets 21 for pressurized fluid from blast shoe 25 to blow articles 4 out of pockets 21.

Other means for aiding article transfer may also be provided. For example, if the articles are steel machine parts, such as screws, and drums 20 and 52 are plastic or some other non-ferous material such as aluminum, a magnet may be placed inside drum 52, to aid transfer of the screws from pockets 21 to pockets 54.

Figure 2:
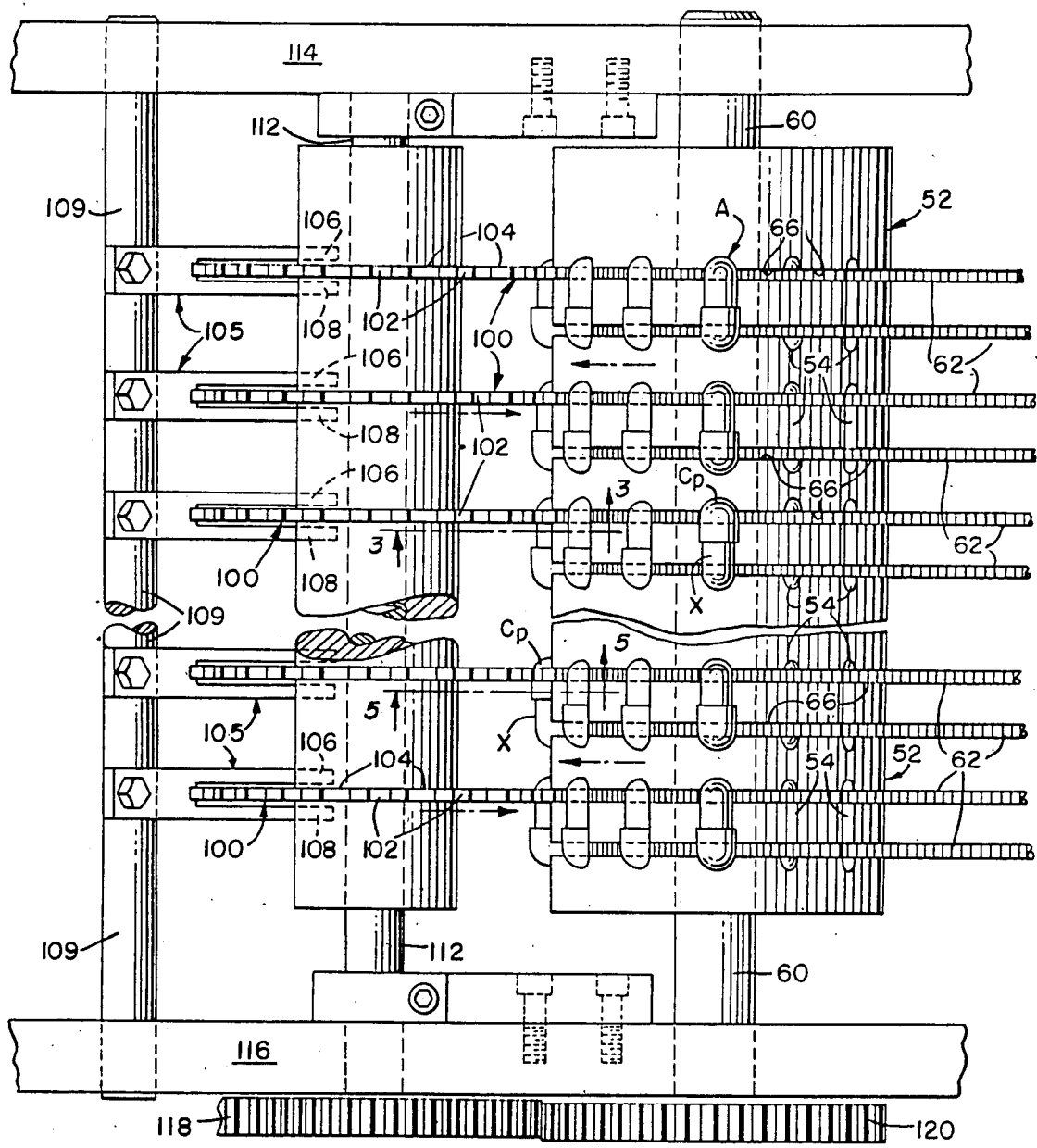
FIG. 2 is a fragmentary sectional view at 2—2 in FIG. 1.

Elongated, preferably extensible or elastic article removal means such as "O" ring-type tubes 62 or even very light chain may be stretched about idler shaft 64 and received in circumferential grooves 66 formed in transfer cylinder 52. A pair of elongated means 62 may be provided for each preferably circumferential row of pockets 54 provided around transfer cylinder 52. As shown in FIG. 2, circumferential grooves 66 receiving elongated means 62 may be positioned around the curved surface of transfer cylinder 52, at positions close to respective axial extremities of pockets 54, with "axial" denoting the direction parallel to the axis of rotation of feed drum 20.

The elongated article removal means 62 force articles 4 out of pockets 52 towards pockets 68 formed in part of an endless conveyor 70. Conveyor 70 travels as indicated by arrow C and carries articles 4 received from transfer cylinder 52. Elongated article removal means 62 are preferably electrically conductive and are grounded to either idler shaft 64 or transfer cylinder 52. This may be important when articles 4 are lightweight and susceptible to static electricity during transfer along their path of travel, from one portion of the apparatus to another.

As shown in FIG. 1, a rotatable pick-off wheel 100 splined to shaft 112 is substantially tangent to transfer cylinder 52 and rotates synchronously with cylinder 52, in the direction indicated by arrow D the surfaces of pick-off wheel 100 and tranfer cylinder 52 move in the same direction at their point of closest approach. Pick-off wheel 100 includes semi-circular or other suitably shaped cut-outs 102, 104 which may alternate around the circumferential periphery of the wheel. Cut-outs 102 have sufficient width to grasp firmly a preselected larger portion of an article 4 but are too wide to grasp a preselected smaller portion of the same article 4.

Stripper 105 is close to pick-off wheel 100 and is mounted on shaft 109 extending substantially the axial length of wheel 100. Each stripper 105 may include two elongated stripping fingers 106, 108 extending on opposite sides of wheel 100. Hopper 110 below pick-off wheel 100 receives articles removed from the traveling array (defined at this position by pockets 54 in transfer cylinder 52) by wheel 100.

Figures 3, 4:
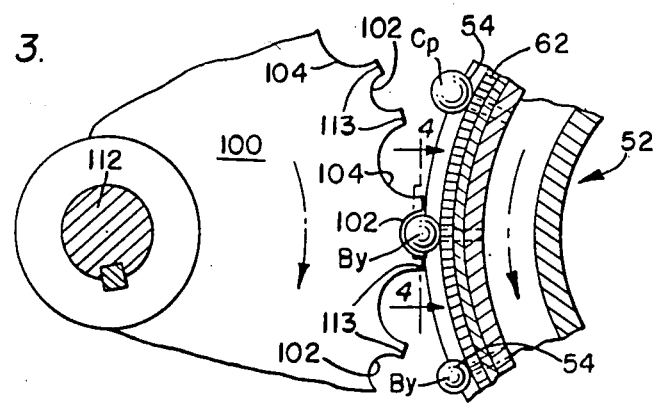
FIG. 3 is a fragmentary sectional view at 3—3 in FIG. 2.
FIG. 4 is a fragmentary sectional view at 4—4 in FIG. 3.
Figure 5:
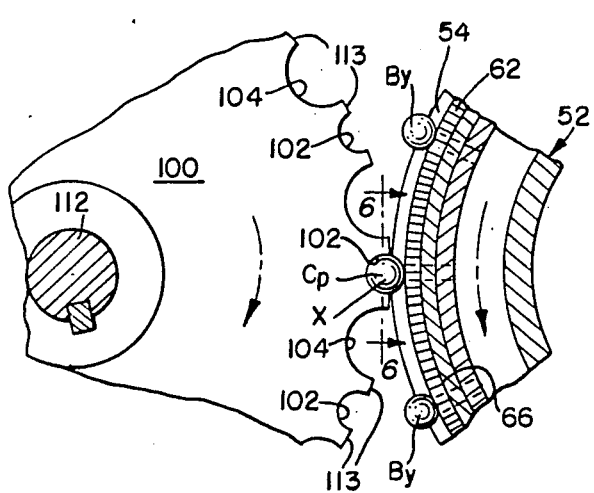
FIG. 5 is a fragmentary sectional view at 5—5 in FIG. 2.
Figure 7:
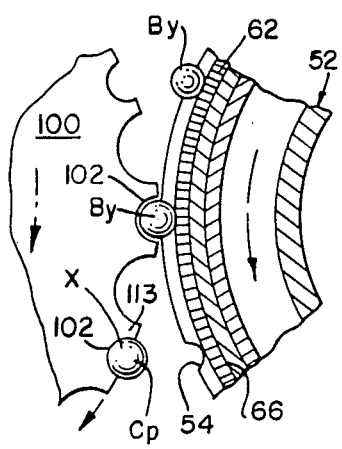
FIG. 7 is a fragmentary sectional view similar to FIG. 5, but illustrating removal of an improperly positioned article from a moving array.
Figure 6:
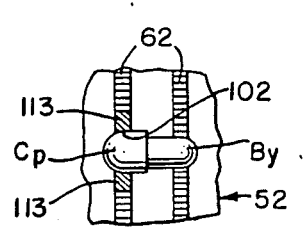
FIG. 6 is a fragmentary sectional view at 6—6 in FIG. 5.

FIGS. 3 and 4 show operation of pick-off wheel 100 with rectified, properly positioned articles, in this case telescoping pharmaceutical capsules. The rectified, properly positioned articles are positioned with their cap portions Cp extending towards one predetermined side (referred to as the cap side) of pockets 54 and their body portions By extending towards the opposite side (referred to as the body side) of pockets 54. Cap portions Cp are larger diameter than are body portions By. FIGS. 5 through 7 show pick-off wheel 100 removing non-rectified, improperly positioned articles, in this case again telescoping pharmaceutical capsules, from transfer cylinder 52. The non-rectified, improperly positioned articles are capsules with bodies By extending towards the cap sides and caps Cp extending towards the body sides of pockets 54.

Shafts 60, 112 and 109 are journalled between side frames 114, 116. Shafts 60 and 112 are driven by gears 118 and 120 respectively which are in turn driven by an appropriate motor, not shown. Articles 4 in the axially extending row appearing vertically as row "A" in FIG. 2 have been received in pockets 54 of transfer cylinder 52 after transfer from cylinder 20 shown in FIG. 1. Articles marked "X" in row "A" in FIG. 2 are non-rectified, improperly positioned articles having cap portions Cp extending towards the body side of pockets 54 in transfer cylinder 52.

FIG. 3 shows that outer extremities 113 of jaws formed in the edge of wheel 100 just clear the surface of transfer cylinder 52. The body portion By of a rectified, properly positioned article is in one of cut-outs 102 due to synchronized rotation of wheel 100 and cylinder 52. Approximately half of the article 4 protrudes from a pocket 54 formed in the surface of cylinder 52. However, cut-out 102 is too wide to grasp the body portion of the article 4 and thus the article 4 continues taveling in pocket 54 as cylinder 52 rotates, until article 4 transfers to conveyor 70 as shown in FIG. 1.

In FIGS. 5 through 7, articles identified X have not been rectified and are improperly positioned--Their cap portions Cp extend in the same direction as the body portions By of rectified, properly positioned articles. In FIGS. 5 and 6, non-rectified improperly positioned article X is firmly grasped by cut-out 102. FIG. 7 shows the position of pick-off wheel 100 and cylinder 52 after article X has been grasped by cut-out 102, with cap portion Cp of article X grasped by cut-out 102. The article is then carried to stripper 105 by pick-off wheel 100. Stripper 105 has fingers 106, 108, shown in FIGS. 1 and 2, and removes article X from wheel 100 and into hopper 110, also shown in FIG. 1.

The non-rectified, improperly positioned articles removed from the moving array may thereafter be loaded into hopper 30 for reprocessing. Articles removed from the moving array defined by cylinder or transfer drum 52 are not harmed during their removal.

By changing angular position of pick-off wheels 100 on shaft 112, by altering the mesh positigears 120 and 118 in FIG. 2, enlarged cut-outs 104, instead of smaller, selective cut-outs 102, envelope but do not grasp the articles. Hence, pick-off wheel 100 may be deactivated and both rectified, properly positioned and non-rectified, improperly postioned articles are unaffected by wheel 100. In such case all articles carried by transfer cylinder 52 are transferred to conveyor 70 in FIG. 1 because cut-out 104 is too large to grasp either a cap portion or a body portion of an article.

Pick-off wheel 100 may be positioned wherever desired. It may be adjacent to pockets 21 of feed drum 20, downstream from rectification devices 42, 48. In such case, transfer cylinder 52 can be omitted and rectified, properly positioned articles may be transferred directly from cylinder 20 to endless conveyor 70.

Pick-off wheel 100 may also remove articles directly from endless conveyor 70. In such case transfer cylinder 52 need not be used and feed drum 20, hopper 30 and the associated equipment may be reversed from the configuration shown in FIG. 1, so articles are transferred directly from feed drum 20 to endless conveyor 70. Such reversal is required for feed drum 20 to travel in the same direction as endless conveyor 70 at the point articles are transferred from feed drum 20 to endless conveyor 70.

If the articles are pharmaceutical tablets or candies, the shape of cavities 21 will be different from that shown. In any event, the shapes of cavities in the feed drum and in the endless conveyor are dictated by the particular articles being transported, positioned and removed. In every case, a moving array of articles results in or on the surface of feed drum 20 and on endless conveyor 70.

Cavities 21 need not be formed in feed drum 20 but may be provided by carriers on the surface of feed drum 20. Likewise, cavities for the articles need not be formed in endless conveyor 70 but may be formed in carriers carried by bars of conveyor 70.

While it is preferable that pick-off wheel 100 move in the same direction as the array of articles from which improperly positioned or unrectified articles are removed, this is not always necessary. For example, in FIG. 1, pick-off wheel 100 can rotate about an axis parallel with the direction of travel of endless conveyor 70, indicated by arrow C. In such case, a timing mechanism can synchronize rotation of pick-off wheel 100 with longitudinal travel of endless conveyor 70, insuring appropriate communication between cut-outs 102 and corresponding cavities in conveyor 70. If such an arrangement is used, directly transferring articles from feed drum 20 to a conveyor 70, with the articles perhaps having their longitudinal axes parallel with the direction of conveyor travel, it is desirable to rotate pick-off wheel 100 about an axis parallel to arrow C so that cut-outs 102 grasp the articles transversely to the article longitudinal axis and hence transversely to the direction indicated by arrow C.

It is also feasible to manufacture the jaws formed in the edge of pick-off wheel 100, defining cut-outs 102, of resilient material, such as spring steel, rubber and the like. This permits pick-off wheel 100 to grasp and to remove a variety of articles from a moving array. As another approach, resilient, perhaps rubber, fingers may be secured to the jaws defining cut-outs 102, with the fingers extending radially outwardly with respect to wheel 100. Such resilient fingers may operate in conjunction with a stripper 105 to remove articles sequentially from the moving array and then, by action of stripper 105, release the articles from the grasp of the resilient fingers.

As yet another approach, pick-off wheel 100 may include moveable jaws, in place of cut-outs 102, operated by a cam or other device synchronized with wheel 100. In such case, the jaws close around an improperly positioned article in the moving array, but only far enough to grasp the improperly positioned article. Properly positioned articles are engaged by the jaws with their smaller dimensions presented to the jaws and are not grasped tightly by the jaws. Once improperly positioned articles had been grasped, the articles travel with pick-off wheel 100, in the grasp of the jaws, around the axis of rotation of pick-off wheel 100 to a position at which the jaws open, releasing the articles.

We claim:

1. Apparatus for arranging individual ones of a plurality of substantially similar articles in a regularly spaced moving two-dimensional array, positioning those individual articles substantially uniformly in the array and transporting the array to a work station, comprising:
   (a) means for storing a plurality of said articles;
   (b) rotatable drum means for removing said articles from said storage means;
   (c) means for positioning said articles uniformly with respect to one another while moving on a curved surface of said rotatable drum, at positions in an arrangement, corresponding to said array;
   (d) means for removing improperly positioned articles from said positions within said arrangement corresponding to said array while moving along a curved path defined by a rotating cylindrical drum;

(e) means, receiving said arranged articles after said improperly positioned articles have been removed, for transporting said articles, in said spaced two-dimensional arrangement defining said array, to a work station.

2. Apparatus for arranging individual ones of a plurality of substantially similar solid articles in a regularly spaced moving two-dimensional array, positioning those individual articles substantially uniformly in the array and transporting the array to a work station, comprising:
   (a) means for randomly storing said articles;
   (b) rotatable drum means for removing said articles from said storage means and placing said articles in said array;
   (c) means for individually positioning said articles substantially uniformly with respect to one another while moving in said array along a curved path defined by at least a portion of the curved surface of a rotating cylinder;
   (d) means for transporting said array of articles to a work station;
   (e) rotatable cylindrical means for removing improperly positioned articles from said moving array as said array passes along a curved path defined by at least a portion of a curved surface of a cylinder proximate a curved surface of said removal means prior to arrival at said work station.

3. Apparatus for arranging individual articles of a plurality of substantially similar articles in a regularly spaced two-dimensional moving array, positioning those individual articles substantially uniformly in the array and transporting the array to a work station, comprising:
   (a) a hopper for storing the articles;
   (b) a cylindrical feed drum having article receptacles at the feed drum curved surface for substantially individually receiving articles from the hopper via an opening in the lower portion of the hopper, the article receptacles at the feed drum surface being substantially uniformly spaced one from another to define spacing of the array;
   (c) a conveyor defined at least in part by a cylinder rotating about its axis for receiving the articles in array arrangement from the feed drum receptacles;
   (d) a rotatable pick-off wheel including gripping means at the periphery thereof for gripping at least the improperly positioned articles in the array carried by the cylinder portion of the conveyor and removing said improperly positioned articles by said gripping means at the wheel periphery moving away from said conveyor means after gripping the improperly positioned articles while essentially tangent to the curved surface of the rotating cylinder portion of said conveyor.

4. A method for arranging individual ones of a plurality of substantially similar articles according to a predetermined orientation in a regularly spaced array and transporting articles in that array having said predetermined orientation to a work station, comprising:
   (a) contacting spaced receptacles traveling along a curved path corresponding to a portion of a curved surface of a cylinder and defining said array with said plurality of articles, thereby permitting individual articles to occupy said receptacles;
   (b) pneumatically manipulating said articles while in said traveling receptacles to move substantially all of said articles into said predetermined orientation within said traveling receptacles;
   (c) maintaining said articles in spaced positions defining said array while transporting said articles from said receptacles to a work station;
   (d) removing the articles during transport which are not in said predetermined orientation from positions in said array before said array reaches said work station by at least partially enveloping each of said articles during transport between mechanical fingers but removing only articles mis-positioned in said array by grasping said mis-positioned articles with said fingers and moving said grasped articles in said fingers away from said array.

5. A method for arranging individual ones of a plurality of substantially similar solid articles in a regularly spaced two-dimensional moving array with all of such articles having the same orientation within said array, comprising:
   (a) removing said articles from an article storing means and separating said removed articles one from another into article transport compartments which are spaced apart along a curved path defined by at least a portion of curved surface of a cylinder to define a moving array of said articles;
   (b) transporting said individual articles in article transport compartments along an at least partially curved path to a work station;
   (c) positioning said individual articles, during transport in their compartments along a curved portion of said path, uniformly with respect to other articles of said plurality in other transport compartments forming part of said moving array; and
   (d) removing improperly positioned articles from their respective transport compartments within the moving array during movement along a curved portion of said path before reaching the work station.

* * * * *